United States Patent [19]

Aussel

[11] Patent Number: 4,871,211
[45] Date of Patent: Oct. 3, 1989

[54] METHOD OF RESTORING REFRACTORY LINING FOR REPEATED USE USING THERMAL SHOCK AND MILLING PROCEDURES

[76] Inventor: Christian C. J. L. Aussel, 43 Avenue du Grand Gour, Martiques, France, 13500

[21] Appl. No.: 187,446
[22] PCT Filed: Jun. 24, 1987
[86] PCT No.: PCT/GB87/00443
 § 371 Date: Apr. 25, 1988
 § 102(e) Date: Apr. 25, 1988
[87] PCT Pub. No.: WO88/00322
 PCT Pub. Date: Jan. 14, 1988

[30] Foreign Application Priority Data

Jun. 24, 1986 [GB] United Kingdom ............... 8615431

[51] Int. Cl.⁴ .......................... B08B 9/00; C21B 7/14
[52] U.S. Cl. .................................. 299/10; 15/104.1 C; 266/281; 299/70
[58] Field of Search .................... 299/18, 41, 70, 95, 299/10; 15/104.1 C; 260/281; 264/30; 432/55, 2, 75; 29/81 D, 81 J

[56] References Cited

U.S. PATENT DOCUMENTS

| | | | |
|---|---|---|---|
| 2,413,746 | 4/1945 | Casey | 414/586 |
| 3,090,983 | 5/1963 | Modrak et al. | 299/70 X |
| 3,471,888 | 10/1969 | Grant et al. | 299/70 X |
| 3,586,113 | 6/1971 | Grant | 299/70 X |
| 3,996,637 | 12/1976 | Shibata et al. | 15/104.1 C X |
| 4,153,965 | 5/1979 | Merly | 15/104.1 C |
| 4,239,291 | 12/1980 | Skendrovic | 299/70 |
| 4,344,652 | 8/1982 | Archenholtz et al. | 266/281 X |
| 4,488,516 | 12/1984 | Bueters et al. | 110/185 X |

FOREIGN PATENT DOCUMENTS

| | | |
|---|---|---|
| 0148711 | 7/1985 | European Pat. Off. . |
| 3242908 | 5/1984 | Fed. Rep. of Germany . |
| 2376390 | 8/1978 | France . |
| 2504829 | 5/1982 | France . |

Primary Examiner—Jerome W. Massie
Assistant Examiner—David J. Bagnell
Attorney, Agent, or Firm—Nixon & Vanderhye

[57] ABSTRACT

A method is provided for restoring a refractory lining for repeated use. The lining is present on a underlying wall surface and is still hot from a previous use when one induces thermal shock in the lining (e.g. by spraying water on it) so as to loosen it. The loosened pieces are then pried away from the wall surface, and they are removed from the area. The residual lining is milled to expose a sound, underlying wall surface, and fine particles, dust, and milled-off pieces are removed. The underlying wall surfaces are thus made speedily available for relining and reuse.

12 Claims, 3 Drawing Sheets

METHOD OF RESTORING REFRACTORY LINING FOR REPEATED USE USING THERMAL SHOCK AND MILLING PROCEDURES

The invention relates to the treatment of refractory linings, which in use come into contact with an erosive substance such as molten metal or glass. The linings may be present on part or all of the surfaces of various items of industrial equipment, for example, runner channels, ladles, torpedo cars, electric arc furnaces, especially the inlet and outlet, tundishes, and the like. For convenience, the invention will be described with reference to the reconditioning i.e. restoration for use of a refractory lined transfer channel, for example a blast furnace runner channel which extends between the furnace and a receptacle, e.g. a ladle, torpedo car or tundish. Such a channel tends to be of generally -U- cross-sectional shape, having a floor and side walls, a lining of refractory concrete being present on the interior of the channel. After molten metal is poured along a transfer channel, a residue is left on the floor and lower region of the side walls. As it solidifies, the residue tends to bind to the refractory concrete. The heat of the molten metal can also damage the refractory lining. The residues must be removed before the transfer channel is used again, often while the channel is still hot and the residues are still red, and this removal is difficult and inconvenient to do, irrespective of whether the work is done manually or using machinery. The restoration work is time consuming, often days, dirty and dangerous.

It is one object of this invention to provide a method and apparatus for use in carrying out the restoration work of such a refractory lining, which is efficient and yet will take less than one working day usually in a matter of hours to perform.

According to one aspect of the invention there is provided a method of restoring a refractory lining for a repeat use, the lining being present on an underlying wall surface, the method being characterized by milling the lining to expose sound clean underlying wall surface, and removing the milled off pieces, fine particles and dust, whereby the underlying wall surface is speedily available for relining and reuse.

In the method, a rotary milling head is urged with rotation along the side wall for a length of about two to three meters and this step is repeated until the total length of the side wall has been milled. Preferably several passes are made to mill each length. As a result of the milling, a large amount of material is released, and this can be removed using a bucket but there are many fine particles and much dust and these are preferably withdrawn by blowing or sucking them away.

While the method steps can be performed manually, for speed, safety and efficiency it is much preferred that the method is performed using a vehicle having caterpillar tracks spaced apart so that one is on each side of the channel, the vehicle also having an arm at the working end of which are releasable coupling means adapted to release or engage one of a set of tools comprising a chisel, a milling tool and a bucket (for the removal of detached residues), and the appropriate tool is coupled to the working end of the arm as required. In a preferred feature each of the tools has latching means adapted to engage complementary latch means at the working end of the arm.

The vehicle preferably includes means for heat insulating and cooling the vehicle when used on a hot channel. Preferably the arm is short and capable of universal movement in any direction so that the tools may reach all parts of the side wall e.g. channel.

For increased stability so that the method may be performed at high speed the vehicle includes a motor and hydraulic system sufficient to provide power to move the vehicle, to actuate the arm and to provide rotation of the milling head, the motor being located on the vehicle so as to provide a low centre of gravity whereby the vehicle and the arm may be moved rapidly.

It will be appreciated that in many cases, e.g. the runner channel, the lining is present on opposite side walls and on the floor. In such a case, extra steps must be taken to treat the lining on the floor and in a preferred feature of the invention, the residue left on the floor from a previous contact with erosive substance is subjected to thermal shock so as to loosen the residue, the loose pieces are prised away and removed, before the side walls are treated. Most preferably, the thermal shock is induced by the application e.g. spraying, of water on to the interior side walls and floor of the channel. This is especially effective when the channel interior is still hot from the previous metal transfer, typically at about 350° C. After the thermal shock treatment a chisel is urged against the residues to prise loose pieces of residue away from the lining.

As a result of the use of the vehicle and the method steps indicated a transfer channel may be restored for reuse in less than eight hours without the vibration typical of hammers.

In an evaluation it has been possible to carry out milling of fifteen meters length of channel in as little time as three hours.

It will be appreciated that the method and vehicle may be used to restore the lining of other containers e.g. metallurgical containers provided that access can readily be gained.

The invention includes the vehicle per se.

In order that the invention may be well understood it will now be described by way of example with reference to the accompanying diagrammatic drawings, in which.

Figure 1:
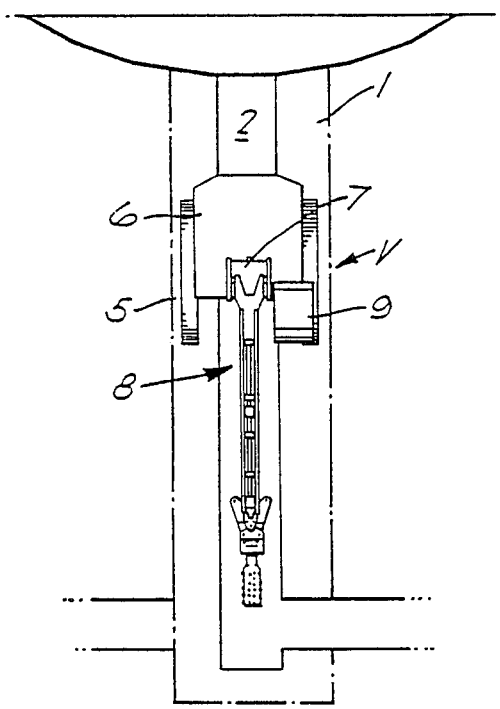
FIG. 1 is a plan view of the vehicle above a channel to be treated.
Figure 2:
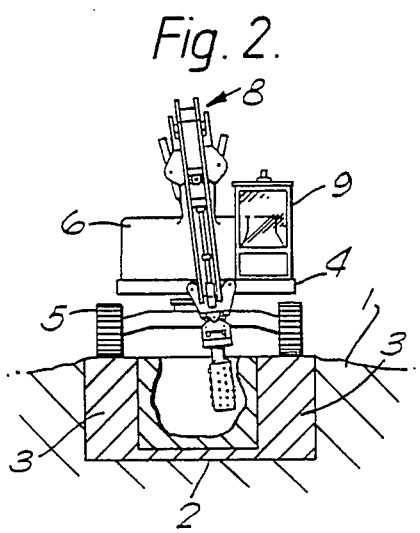
FIG. 2 is a sectional view at the milling stage.
Figure 7:
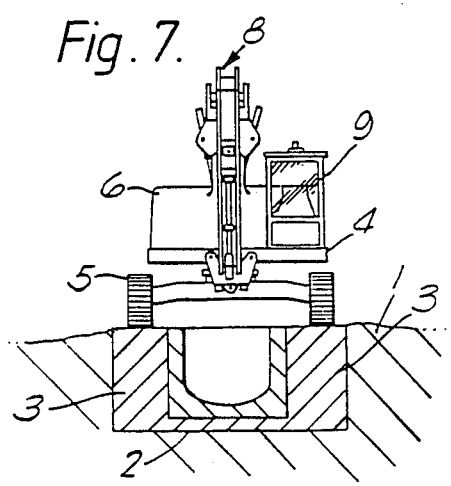
FIG. 7 shows the restored channel.

Referring first to FIGS. 1 and 2, the transfer channel comprises an elongate body of generally -U- cross-sectional shape. The channel has an outer metal shell 1, and an inner lining of refractory concrete. The channel has a floor 2 and an upstanding side walls 3. The channel may extend from a furnace towards a ladle station (not shown). As shown in FIG. 2, as a result of the residues from one tapping of the furnace, the inner contour of the lining has become irregular, and the shape must be restored before the next tapping from the furnace.

The vehicle V comprises a platform 4 or turntable mounted on caterpillar tracks 5. The tracks are spaced apart so that the vehicle V can pass over the channel 1 with the tracks one on each side. A hydraulic motor and pump, not shown, are mounted in a housing 6 at the rear of the platform, at a location to give the total vehicle a low centre of gravity. At the front of the vehicle is a mounting for an arm 8, and a driver's cab 9 is present at one side.

Figure 3:
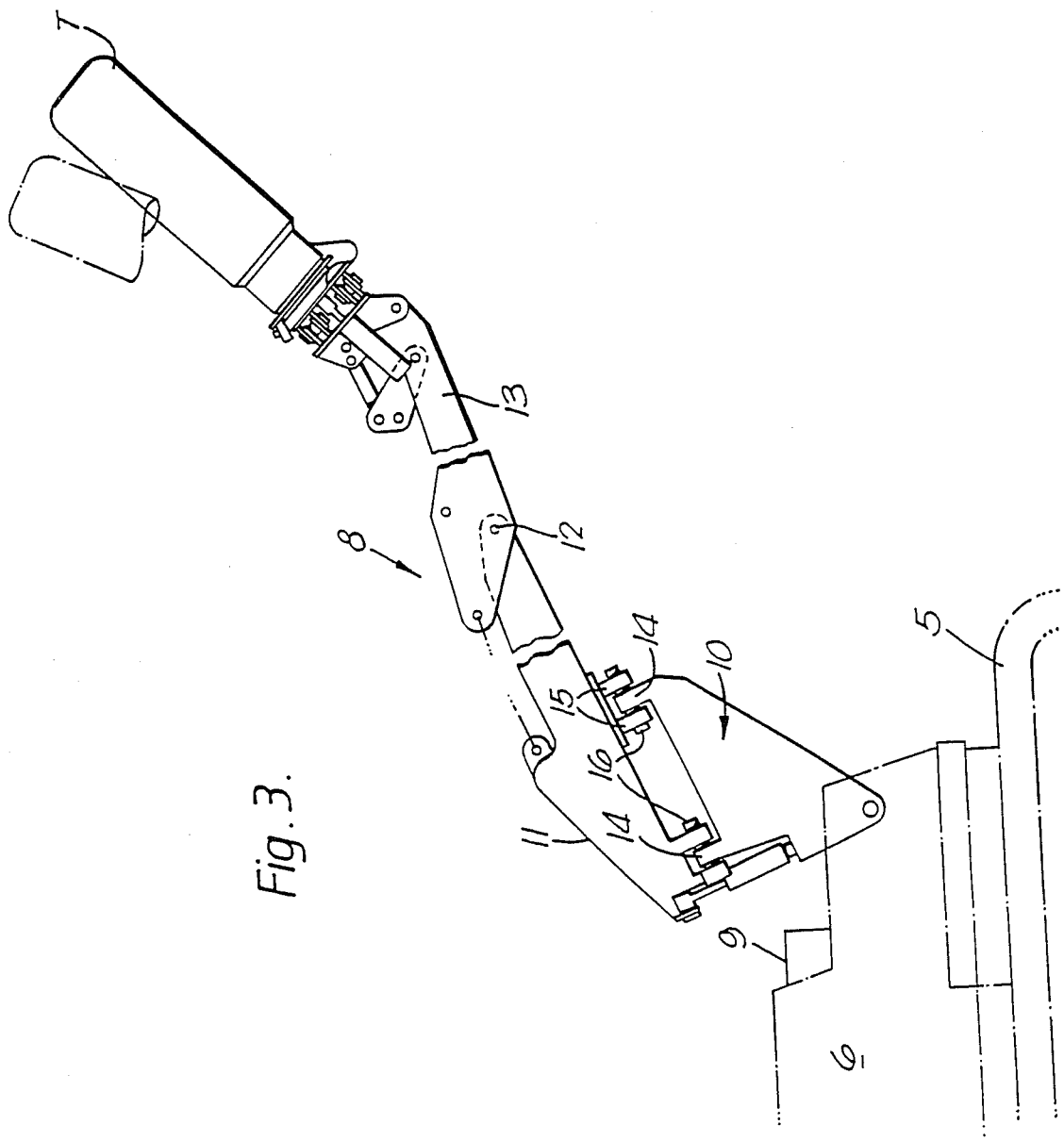
FIG. 3 is a side elevation of the vehicle.
Figure 4:
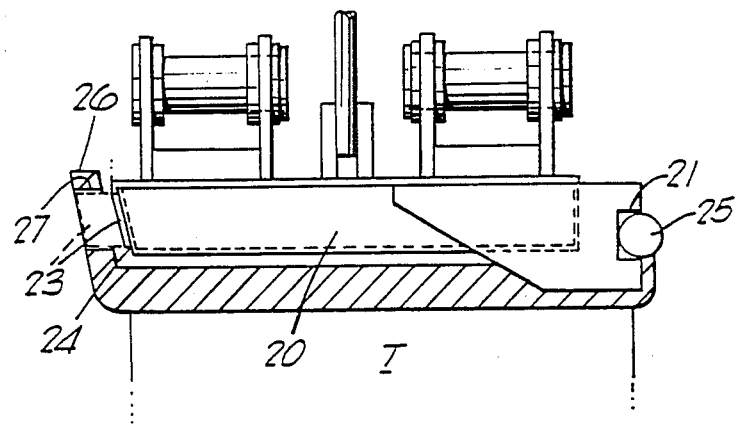
FIG. 4 is a side view, partly in cross-section and partly in elevation, of the quick release coupling system at the end of the arm of the vehicle of FIGS. 1 through 3.
Figure 5:
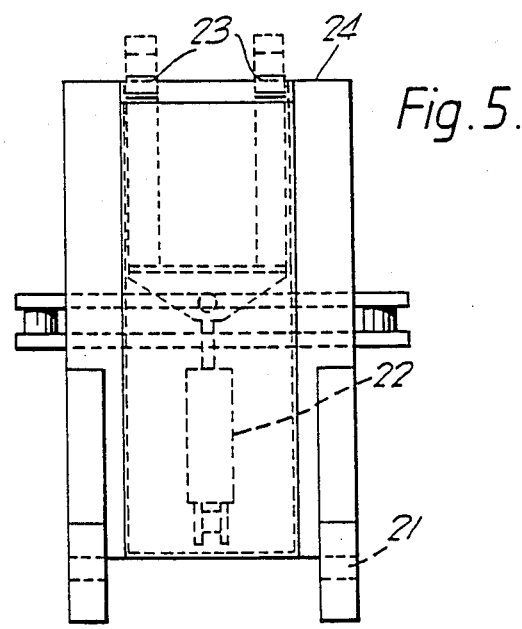
FIG. 5 is a top plan view of the quick release coupling system of FIG. 4.
Figure 6:
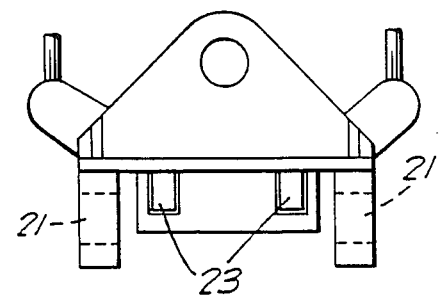
FIG. 6 is an end view of the quick release coupling system of FIG. 4.

As shown in FIG. 3, the arm 8 comprises a base portion 10, a rearward portion 11, ending in an elbow 12 from which extends a forward portion 13. The base 10 portion has a pair of end uprights 14, and the rearward portion 11 has a pair of depending members 15; and these are held together by pivot pins 16 so that the arm may rotate about the pivot pins 16. A network of hydraulically operated piston and cylinders is present e.g. to extend, retract the elements of the arm, and is powered by the motor and pump in the housing 6.

At the end of the arm is a quick release coupling system. This comprises a horizontal block 20 having at one end a pair of arcuate slot 21 defining latch or cam surfaces. The block contains a reciprocating piston 22 connected to two square pins 23 which can project beyond one end 24 of the block. Each tool T includes a latch peg 25 arranged to be received in each arcuate latch slot 21 and an end plate 26 having two holes 27 shaped to receive the square pins 23. The tools can be arranged in a holder or rack with the upper end uppermost. The arm is brought to the tool with the square pins retracted. The peg is engaged with the slot, and then the square pins are received in the holes. The tool is thus firmly engaged with the arm which is moved away for use. The tool may be released in reverse arrangement.

The method of the invention is carried out as follows:

(1) The interior of the channel is sprayed with a jet of water in sufficient volume to cool the channel and to induce a thermal shock in the melt at the bottom of the channel.

(2) The chisel is then fitted to the vehicle arm and the vehicle is then brought to the channel. The arm is moved to cause the chisel to make successive cuts of slight depth and then prise the residues to be loosened from the floor of the channel and the lower part of the side wall.

This work makes it possible to disengage a part of the damaged concrete and is preferably carried out in small rapid passes in order not to shake or attack the sound concrete, i.e. the concrete in good condition.

(3) The bucket is fitted to the arm and the loosened metal slag is removed.

This is necessary to judge visually whether the work of the rock-breaker has been adequate and if not step (2) is repeated.

(4) The milling head is then fitted to the arm and then milling is performed.

This step consists of milling the edges and bottom of the channel by successive passes until sound concrete is produced (white/grey colour). The operator has to guide the cutter parallel to the wall of the channel and keep the cutter in contact over the entire height. The rotation movement induces a natural displacing motion of the cutter along the wall which the operator must not oppose but accompany gently, over a length of two to three meters and by successive passes.

The bottom of the channel is cleaned, the tool having a limited angle to the horizontal and drawn along the channel.

Using the vehicle of the invention, about fifteen meters can be milled in about three hours.

(5) The bucket is then fitted and the residues are removed.

(6) Powerful blowing is then applied to remove the fine residues and dust. Instead a hood may be fitted over the channel and a suction applied to withdraw the dust. The time for the total operation is approximately five hours.

I claim:

1. A method of restoring a refractory lining for repeated use, the lining, having residue thereon, being present on an underlying wall surface, comprising the steps of:

while the lining is still hot from a previous use, inducing thermal shock in the lining so as to loosen the residues;

prying the loosened residue pieces away from the wall surface;

removing the loose pieces from the wall surface area;

milling the residual lining to expose the sound, underlying wall surface; and removing fine particles, dust, and milled-off pieces from the wall surface area, whereby the underlying wall surface is speedily available for relining and reuse.

2. A method according to claim 1, wherein said milling step is accomplished by urging a rotary milling head with rotation in contact with the lining for a length of about two to three meters and this step is repeated until the length of the lining has been milled.

3. A method according to claim 2 wherein several passes are made to mill each length.

4. A method according to claim 1, wherein the method is performed using a vehicle having caterpillar tracks spaced apart so that one is on each side of opposite walls having the lining, the vehicle also having an arm at the working end of which are releasable coupling means adapted to release or engage one of a set of tools comprising a chisel, a milling tool and a bucket for the removal of detached residues, and the appropriate tool is coupled to the working end of the arm as required.

5. A method according to claim 4, wherein each of the tools has latching means adapted to engage complementary latch means at the working end of the arm.

6. A method according to claim 4 wherein the vehicle includes a motor and hydraulic system sufficient to provide power to move the vehicle, to actuate the arm and to provide rotation of the milling tool, the motor being mounted on the vehicle so as to provide a low centre of gravity whereby the vehicle and the arm may be moved rapidly.

7. A method according to claim 1, wherein the thermal shock is induced by the application of water on to the side walls.

8. A method as recited in claim 7 wherein the step of applying water to the sidewalls and floor of the channel is accomplished by spraying.

9. A method according to claim 1 wherein after the thermal shock treatment a chisel is urged against the residues to prise loose pieces of residue away from the lining.

10. A method according to claim 1, wherein the lining is present on part or all of a surface of a runner channel, ladle, torpedo car, electric arc furnace.

11. A method according to claim 1 wherein the lining is at about 350° C. just prior to the step of inducing thermal shock.

12. A method as recited in claim 1 wherein said step of removing the fine particles and dust is accomplished by blowing or sucking the fine particles and dust away.

* * * * *